United States Patent [19]

Pazder

[11] Patent Number: 4,474,532
[45] Date of Patent: Oct. 2, 1984

[54] COOLABLE AIRFOIL FOR A ROTARY MACHINE

[75] Inventor: Mark J. Pazder, South Windsor, Conn.

[73] Assignee: United Technologies Corporation, Hartford, Conn.

[21] Appl. No.: 334,618

[22] Filed: Dec. 28, 1981

[51] Int. Cl.³ .............................................. F01D 5/18
[52] U.S. Cl. .................................... 416/97 R; 415/115
[58] Field of Search .......................... 415/115, DIG. 1; 416/90 R, 91, 92, 96 A, 97 R

[56] References Cited

U.S. PATENT DOCUMENTS

| | | | |
|---|---|---|---|
| 3,171,631 | 3/1965 | Aspinwall | 416/90 |
| 3,533,712 | 10/1970 | Kercher | 416/97 R |
| 3,799,696 | 3/1974 | Redman | 416/97 R |
| 3,807,892 | 4/1974 | Frei et al. | 416/97 R |
| 4,073,599 | 2/1978 | Allen et al. | 416/97 R |
| 4,177,010 | 12/1979 | Greaves et al. | 416/96 A X |
| 4,180,373 | 12/1979 | Moore et al. | 416/97 R |
| 4,236,870 | 12/1980 | Hucul, Jr. et al. | 416/97 R |
| 4,257,737 | 3/1981 | Andress et al. | 415/115 X |
| 4,278,400 | 7/1981 | Yamarik et al. | 416/97 R |

FOREIGN PATENT DOCUMENTS 2476207 9/1981 France ............................. 416/97 R
1410014 of 1915 United Kingdom ............. 416/97 R Primary Examiner—Philip R. Coe
Assistant Examiner—Frankie L. Stinson
Attorney, Agent, or Firm—Gene D. Fleischhauer

[57] ABSTRACT

A coolable airfoil 16 for a rotary machine is disclosed. The coolable airfoil includes a plurality of cooling passages 56, 86, 88 and 114 extending in the spanwise direction. A plurality of turning passages such as the turning passage 82 and the turning passage 90 turn the flow between the spanwisely extending passages. A vane 92 in the turning passage 90 is spaced from a spanwisely extending baffle 48 to form a sub-passage 94 therebetween upstream of a corner region 90c. A trip strip 96 extends between the vane and the wall and is angled with respect to the approaching flow. A similar construction is found in the turning passage 82. In one particular embodiment, the turbine blade includes a spanwisely extending leading edge passage connected to the trailing edge region by a chord-wisely extending tip passage 58.

5 Claims, 4 Drawing Figures

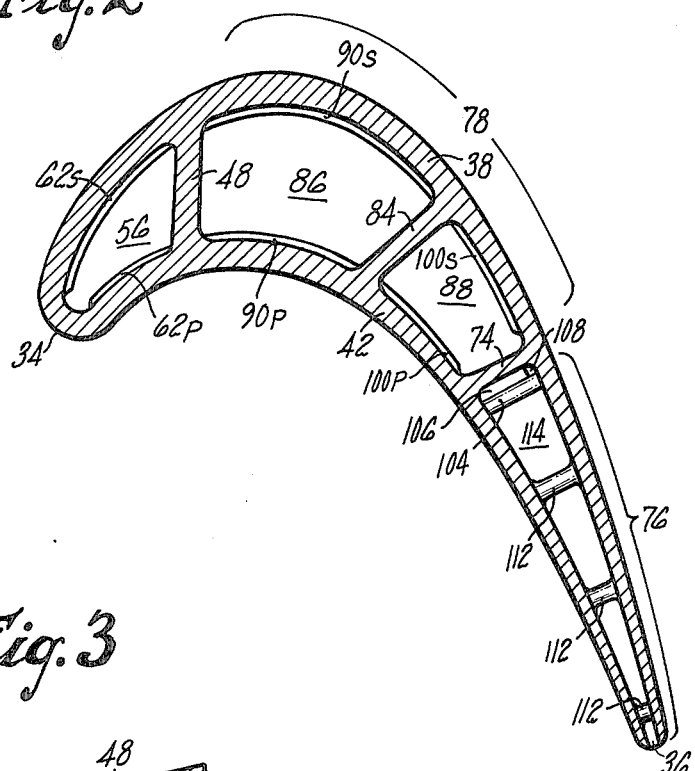
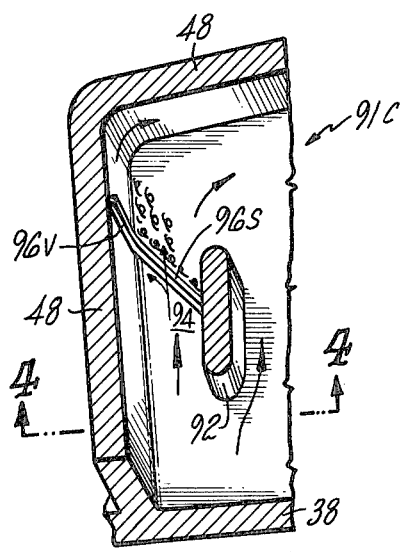
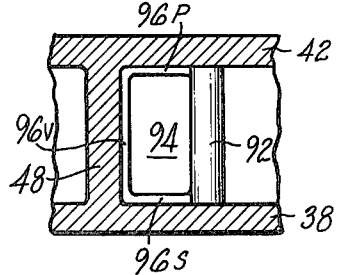

COOLABLE AIRFOIL FOR A ROTARY MACHINE

DESCRIPTION

1. Technical Field

This invention relates to coolable airfoils used in high temperature rotary machines and more specifically to structure for cooling such airfoils. The concepts disclosed have application to both turbine vanes and turbine blades.

2. Background Art

A rotary machine burns fuel in combustion chambers to provide energy to the machine in the form of hot working medium gases. The hot working medium gases are flowed to the turbine section of the machine. In the turbine section, airfoils form stationary arrays of stator vanes and rotating arrays of rotor blades. These airfoils are employed to direct the flowing gases and to extract energy from the gases. As a result, the airfoils are bathed in a hot working medium gases during operation of the engine causing thermal stresses in the airfoils which affect the structural integrity and fatigue life of the airfoil. These thermal stresses have been a constant source of concern since the advent of high temperature rotary machines, such as gas turbine engines, because of the need to operate the engine at high temperatures to maximize engine efficiency. For example, the airfoils in the turbines of such engines may see temperatures in the working gases as high as 2,500° F. (twenty-five hundred degrees Fahrenheit). The blades and vanes of these engines are typically cooled to preserve the structural integrity and the fatigue life of the airfoil by reducing the level of thermal stresses in the airfoil.

One early approach to airfoil cooling is shown in U.S. Pat. No. 3,171,631 issued to Aspinwall entitled "Turbine Blade". In Aspinwall, cooling air is flowed to the cavity between the suction sidewall and the pressure sidewall of the airfoil and diverted to various locations in the cavity by the use of turning pedestals or vanes. The pedestals also serve as support members for strengthening the blade structure.

As time passed, more sophisticated approaches employing torturous passages were developed as exemplified in the structure shown in U.S. Pat. No. 3,533,712 issued to Kercher entitled "Cooled Vane Structure for High Temperature Turbines". Kercher discloses the use of serpentine passages extending throughout the cavity in the blade to provide tailored cooling to different portions of the airfoil. The airfoil material defining the passages provides the necessary structural support to the airfoil.

Later patents, such as U.S. Pat. No. 4,073,599 issued to Allen et al entitled "Hollow Turbine Blade Tip Closure" disclose the use of intricate cooling passages coupled with other techniques to cool the airfoil. For example, the leading edge region in Allen et al is cooled by impingement cooling followed by the discharge of the cooling air through a spanwisely extending passage in the leading edge region of the blade. The flowing air in the passage also convectively cools the leading edge region as did the passage in Aspinwall.

The cooling of turbine airfoils using intricate cooling passages having multiple passes and film cooling holes alone or in conjunction with trip strips to promote cooling of the leading edge region are the subject of many of the latest patents such as: U.S. Pat. No. 4,177,010 issued to Greaves et al entitled "Cooled Rotor Blade for A Gas Turbine Engine" (film cooling holes); U.S. Pat. No. 4,180,373 issued to Moore et al entitled "Turbine Blade" (film cooling holes and trip strips); U.S. Pat. No. 4,224,011 issued to Dodd et al entitled "Cooled Rotor Blade for A Gas Turbine Engine" (film cooling holes); and U.S. Pat. No. 4,278,400 issued to Yamarik et al entitled "Coolable Rotor Blade" (film cooling holes and trip strips). These blades are typified by large cooling air passages in relation to the thickness of the walls in the leading edge region of the blade.

The main internal heat transfer mechanism in the passages of multipass blades is convective cooling of the abutting walls. Zones of low velocity in the cooling air which is adjacent the walls defining the passage reduce the heat transfer coefficients in the passage and may result in over temperaturing of these portions of the airfoil. U.S. Pat. No. 4,180,373 issued to Moore et al entitled "Turbine Blade" employs a trip strip in a corner region of a turning passage which projects from a wall into the passage to prevent stagnation at the corner formed by the interaction of adjacent walls.

The above art notwithstanding, scientists and engineers are seeking to develop coolable airfoils for use in high temperature turbines which efficiently use cooling air and which suppress the formation of zones of low velocity cooling air in turning regions of the airfoil.

DISCLOSURE OF INVENTION

According to the present invention, an airfoil having multi-pass cooling passages has a chordwisely extending turning region at the end of each passage, and a subpassage formed within the turning region for channeling a portion of the flow over at least one trip strip canted with respect to the approaching flow in the subpassage and angled at an acute angle with respect to a wall bounding the passage to suppress separation of the flow from the wall bounding the passage and to block the formation of zones of low velocity flow.

A primary feature of the present invention is a plurality of spanwisely extending cooling passages. Another feature is the chordwisely extending turning passage in fluid communication with one of said passages. The chordwisely extending turning passage has a subpassage and at least one trip strip canted with respect to the approaching flow. In one embodiment, the trip strip extends from the downstream end of the vane across the subpassage to the adjacent vane.

A principal advantage of the present invention is the level of thermal stresses in the vane which results from cooling in the turning passage which includes cooling of the corner regions. Effective cooling of the corner region results from the subpassage and the angled trip strip which directs the flow to block the formation of zones of low velocity flow and to suppress the separation of the cooling flow from the walls of the passage as the flow moves through the turn.

Other features and advantages will be apparent from the specification and claims and from the accompanying drawings which illustrate an embodiment of the invention.

BRIEF DESCRIPTION OF THE DRAWING

FIG. 2 is a cross-sectional view taken along the lines 2—2 of FIG. 1;

FIG. 3 is a partial perspective view of a corner region of a turning passage in the airfoil; and FIG. 4 is a view taken along the lines 4—4 of FIG. 3.

BEST MODE FOR CARRYING OUT THE INVENTION

Figure 1:
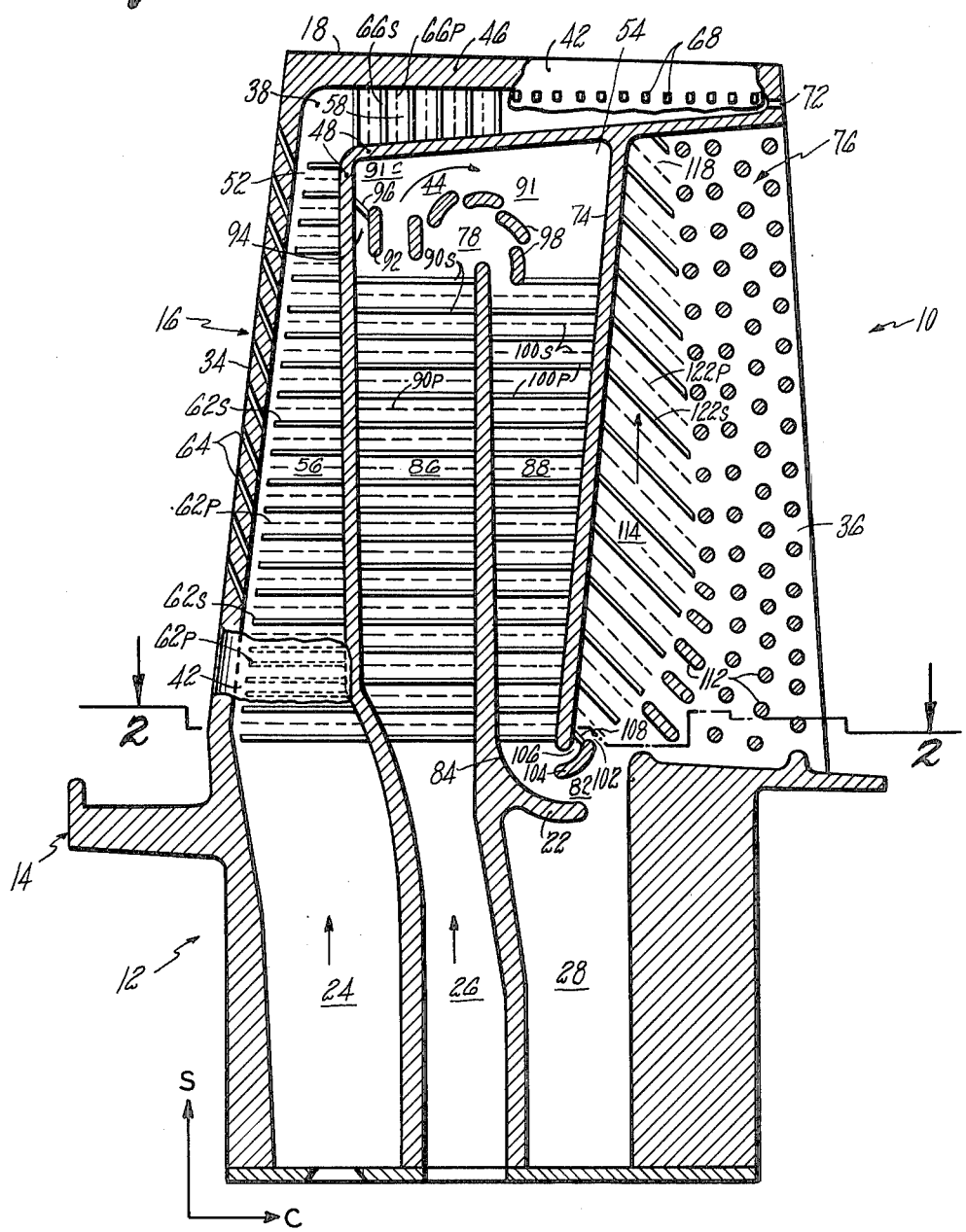
FIG. 1 is a side elevation view of a rotor blade partly in section and partly broken away to show the suction sidewall of the interior of the airfoil.

FIG. 1 shows a rotor blade 10 for a rotary machine. The rotor blade has a root section 12, a platform section 14 and an airfoil section 16. The root section is adapted to engage the rotor of a rotary machine. The platform section is adapted to form a portion of the inner wall of the flow path for working medium gases in a rotary machine. The airfoil section is adapted to extend outwardly across the flow path for the working medium gases and has a tip 18 at its most outward end. The rotor blade has a spanwise reference direction S and a chordwise reference direction C.

The root section 12 has a chordwisely extending root wall 22. A first duct 24 is in fluid communication with a source of cooling air such as a compressor (not shown). A second duct 26 is in fluid communication with the source of cooling air and a third duct 28 extends through the root section. In the embodiment shown, the third duct is not in fluid communication with the source of the cooling air. A plate 32 extends across the third duct and blocks communication with the source of cooling air. In an alternate embodiment, the third duct is in fluid communication with the source of cooling air.

The airfoil section 16 has a leading edge 34 and a trailing edge 36. A suction sidewall 38 and a pressure sidewall 42 (partially broken away in FIG. 1 for clarity and shown in FIG. 2) are joined at the leading edge and the trailing edge. The pressure sidewall is spaced from the suction sidewall to form a cavity 44 therebetween. An internal tip wall 46 extends between the pressure sidewall and the suction sidewall to bound the cavity in the spanwise direction. An internal wall, such as first baffle 48, extends in the spanwise direction and is spaced from the leading edge and also extends in the chordwise direction and is spaced from the tip wall. The first baffle divides the cavity in the airfoil into a first portion 52 and a second portion 54 such as the rear portion.

The first portion 52 includes a first passage 56 extending spanwisely along the region of the leading edge and a tip passage 58 extending chordwisely along the tip wall 46. The first passage has a plurality of first trip strips 62s on the suction sidewall bounding the first passage and a plurality of second trip strips 62p on the pressure sidewall of the first passage. The projection of each of the second trip strips of the pressure sidewall is shown by broken lines on the suction sidewall. Each trip strip is of a height which permits flow over the trip strip. A plurality of cooling holes 64 extend through the leading edge to place the first passage in flow communication with the working medium flowpath. The cooling air holes are canted at an obtuse angle with respect to the approaching flow in the first passage and with respect to the spanwisely extending leading edge 34. A plurality of first trip strips 66s and 66p in the tip passage extend on the suction sidewall and the pressure sidewall in a similar fashion to the plurality of trip strips 62 in the first passage. The tip passage has a plurality of film cooling holes 68 distributed inwardly of the tip wall on the pressure sidewall of the tip wall. These cooling holes and a hole 72 in the tip passage place the tip passage in fluid communication with the working medium flowpath.

The rear portion of the airfoil has an internal wall, such as a second baffle 74, extending spanwisely from the first baffle to divide the rear portion of the airfoil into a trailing edge region 76 and a midchord region 78. A chordwisely extending turning passage 82 places the trailing edge region in fluid communication with the midchord region. An internal wall, such as a third baffle 84, extends spanwisely to divide the midchord region into a second passage 86 and a third passage 88. The second passage has a plurality of first trip strips 90s on the suction sidewall of the passage and a plurality of second trip strips 90p on the pressure sidewall of the airfoil. A chordwisely extending turning passage 91 places the second passage in fluid communication with the third passage. The chordwisely extending passage has a corner region 91c. A vane 92 extends between the suction sidewall and the pressure sidewall and is spaced from the first baffle 48 leaving a subpassage 94 therebetween. At least one angled trip strip 96 extends along the suction sidewall across the subpassage from the downstream end of the vane to the wall. The angled trip strip is canted toward the approaching flow and forms an acute angle with respect to the first baffle. The vane 92 and the subpassage 94 are disposed in the turning passage upstream of the corner region. A plurality of turning vanes 98 extend between the suction sidewall and the pressure sidewall to guide the flow from the first passage into the second passage. A plurality of trip strips 100p and 100s are disposed in the second passage.

The first turning passage 82 has a corner region 102. The turning passage has a vane 104 upstream of the corner region and spaced from the second baffle 74 leaving a subpassage 106 therebetween. A trip strip 108 extends from the vane to the baffle. The trip strip is canted toward the approaching flow and is at an acute angle with respect to the baffle 74. The angle between the trip strip and the baffle is approximately 45° degrees. It is believed that trip strips having an angle lying between 15° degrees and 60° degrees will prove effective depending on the velocity of the flow in the passage and on the height of the trip strips.

The trailing edge region 76 is in fluid communication with the working medium flowpath through a plurality of spaced apart pedestals 112. Each pedestal extends between the suction sidewall and the pressure sidewall to locally block the flow and, with the second baffle 74, to define a spanwisely extending passage 114 for cooling air. The passage includes a corner region 118 adjacent the first baffle 48 and the second baffle 74 in the region where the passage discharges its flow through the pedestals to the working medium flowpath. A plurality of trip strips 122 are canted toward the approaching flow along the baffle in the trailing edge region and in the corner region. The trip strips include a first plurality of trip strips 122s on the suction sidewall and a second plurality of trip strips 122p on the pressure sidewall.

FIG. 2 is a cross-sectional view taken along the lines 2—2 of FIG. 1 and shows the suction sidewall 38 and the pressure sidewall 42 of the airfoil section. The plurality trip strips 62p and 62s are shown extending respectively from the pressure sidewall and the suction sidewall as are the plurality of trip strips 91p and 91s and 100p and 100s. The vane 104 extends between the pressure sidewall and the suction sidewall to form the passage 106 between the vane and the baffle 74. The angled trip strip 108 extends between the vane and the baffle.

FIG. 3 is a partial perspective view of the corner region 91c of FIG. 1. FIG. 4 is a sectional view taken along the lines 4—4 of FIG. 3. The vane 92 is spaced from the adjacent baffle 48 leaving the subpassage 94 therebetween. The angled trip strip on the suction sidewall extends from the downstream end of the vane to the baffle and is canted toward the approaching flow which is channeled to the trip strip by the vane. A corresponding angled trip strip 96p extends on the pressure sidewall between the vane and the baffle 48. A vertical trip strip 96v on the baffle 48 connects the trip strips 96s with the trip strip 96p.

During operation of the rotary machine, hot working medium gases are flowed over the exterior surface of the airfoil section 16. Heat is transferred from the gases to the suction sidewall 38 and the pressure sidewall 42. Cooling air is flowed from the first duct 24 through the first passage 56 and through the tip passage 58 to reduce the temperature of the blade. As the flow of cooling air passes over the trip strips 62s, 62p and the trip strips 66s, 66p, the trip strips cause vortices in the flow and turbulence in the boundary which increases the convective transfer of heat between the walls and the cooling air. In addition to this convection cooling in the first passage and the tip passage, film cooling is provided by cooling air flowed through cooling holes 64 in the leading edge region. The film cooling holes are angled at an obtuse angle to the leading edge and the approaching flow in the cooling air passage. Each of the angled jets of cooling air has a component of velocity in the spanwise direction along the leading edge. Because of the spanwise component of velocity, the cooling is washed over a larger area than occurs with jets of air having no spanwise component of velocity. Cooling air is exhausted from the tip passage through the cooling air holes 68 in the pressure sidewall for film cooling of the tip region. Because the static pressure in the working medium flowpath is greater on the pressure sidewall than the static pressure on the suction sidewall, it is believed the cooling air from the holes 68 washes over the tip of the airfoil providing film cooling to the rearward portion of the tip of the airfoil. The remaining portion of the cooling air is discharged through the hole 72 in the trailing edge region of the blade. On occasion, one or more of the cooling holes 64 in the leading edge region 34 are plugged by particulates as the particulates pass through the engine and strike the blade. The plugged holes cannot pass cooling air. The holes 68 and 72 flow this additional amount of air to insure that an adequate amount of convection cooling is provided in the first passage and the tip passage.

Cooling air is flowed from the second duct 26 through the second passage 86 to the chordwisely extending turning passage 91. The vane 92 upstream of the corner region 91c in the turning passage forms a subpassage 94 in the turning passage for channeling a portion of the cooling air over the trip strip 96p, 96s, and 96v into the corner region 91c of the chordwisely extending passage 90. The trip strips 96s and 96p extending across the subpassage are angled with respect to the wall and the vane and are angled toward the approaching flow. These two trip strips (suction surface and pressures surface) have a cumulative height between the two trip strips of 15% of the height of the passage.

As shown in FIG. 3, the vane 92 increases the flow of cooling air to the trip strip, increasing the amount and velocity of the vortices which are shed by the trip strips. Each vortice has a component of velocity toward the baffle. The vortices move into the corner region. The vortices in the corner region increase the rate of heat transfer in the region by reason of the turbulence they cause and increase the amount of flow in the region by reason of their chordwise component of velocity which is opposite in direction to the turning flow. In addition to the vortices, the trip strips cause a portion of the flow in the subpassage upstream of the trip strips to be diverted toward the baffle as shown by the two streamlines in the region of the trip strip.

The corner region 102 similarly has a vane 104 forming a subpassage 106 and a trip strip 108 which causes vortices downstream of the subpassage and which diverts a portion of the flow towards the second baffle to suppress separation of the flow from the side of the baffle as the flow enters the trailing edge region. The single trip strip 108 in the corner region 102 which extends across the subpassage 106 extends for a height of approximately 15% of the total height of the subpassage 106. The process is repeated in the corner region 118 by the plurality of angled trip strips along the entire passage 114. As the cooling air moves along the passage, a portion of the flow is exhausted through the spaced apart pedestals 112. The turning action of the flow away from the baffle through the pedestals 112 tends to cause separation of the flow from the baffle. The trip strips 122s, 122p are canted toward the approaching flow of cooling air and angled with respect to the baffle 74 to form vortices and to divert flow towards the wall of the baffle along the entire length of the passage. The velocity of the flow toward the baffle and the amount of flow along the baffle suppresses separation of the flow from the baffle and thus provides satisfactory cooling of the baffled region. The angled trip strips also provide adequate cooling to the corner region 118 because of the increased momentum of the flow along the baffle which causes the flow of cooling air to be carried into the corner region where the air cools the corner region. After the flow passes through the corner region, the flow is exhausted into the working medium flowpath through the trailing edge region of the blade.

Although the invention has been shown and described with respect to preferred embodiments thereof, it should be understood by those skilled in the art that various changes and omissions in the form and detail thereof may be made therein without departing from the spirit and the scope of the invention.

I claim:

1. In a coolable airfoil of the multiple pass type having internal walls extending between the pressure and suction sidewalls of the airfoil for defining separate passages internally of the airfoil, and including a chordwisely extending passage for turning cooling flow with respect to at least one of said separate passages, said chordwisely extending passage being bounded by one of the internal walls, the improvement comprising:

a vane extending between the suction sidewall and the pressure sidewall, the vane being spaced from said internal wall bounding the chordwisely extending passage leaving a subpassage therebetween in the chordwisely extending passage, and at least one trip strip on one of said sidewalls in said chordwisely extending passage which is canted toward the approaching flow of cooling air to suppress the separation of the flow from said internal wall and which extends at an acute angle from said internal wall to the vane to divert a portion of the flow in the subpassage against said internal wall and to cause turbulence in the boundary layer adjacent said internal wall.

2. The coolable airfoil of claim 1 wherein the canted trip strip is a first canted trip strip which extends on the suction sidewall across the subpassage from the vane to said internal wall and a second canted trip strip extends on the pressure sidewall across the subpassage from the vane to said internal wall.

3. The coolable airfoil of claim 2 wherein the airfoil further has a third trip strip extending on said internal wall from the first canted trip strip to the second canted trip strip.

4. The coolable airfoil of claim 3 wherein the passage has a height h and wherein the height of the passage is reduced by approximately 15% at the location of the trip strip on the suction sidewall.

5. A coolable rotor blade for an axial flow rotary machine which comprises:
- a root section which adapts the rotor blade to engage a rotor assembly, the root section having a chordwisely-extending root wall, a first duct adapted to be in fluid communication through the root wall with a source of cooling air, a second duct adapted to be in fluid communication with a source of cooling air, and a third duct extending through the root wall,
- an airfoil section having:
  - a leading edge,
  - a trailing edge,
  - a suction sidewall,
  - a pressure sidewall joined to the suction sidewall at the leading edge and the trailing edge and spaced from the suction sidewall to form a cavity therebetween,
  - a tip wall extending in a chordwise direction between the suction sidewall and the pressure sidewall,
  - a first baffle which extends in the spanwise direction and is spaced from the leading edge and which extends in the chordwise direction and is spaced from the tip wall to divide the cavity into a rear portion, a front portion having a first passage, and a tip portion having a tip passage in fluid communication with the first passage,
  - a second baffle which extends in the spanwise direction from the first baffle to divide the rear portion of the cavity into a trailing edge region and a midchord region and which is spaced from the root wall in the root section leaving a first chordwisely extending turning passage therebetween.
  - a third baffle which extends in the spanwise direction to divide the midchord region of the blade into a second passage extending outwardly from the root region toward the chordwisely extending portion of the first baffle, and a third passage extending inwardly from the chordwisely extending portion of the first baffle, the third baffle being spaced from the chordwisely extending portion of the first baffle leaving a second chordwisely extending turning passage therebetween, wherein the first passage is in fluid communication with the first duct, wherein the first passage has a plurality of trip strips extending across the first passage normal to the direction of flow, and the leading edge has a plurality of holes for film cooling extending through the edge which are angled to form an obtuse angle with respect to the approaching flow and which places the first passage in flow communication with the work medium flow path, wherein a second plurality of trip strips extend across the tip passage on the suction sidewall and the pressure sidewall normal to the flow, a plurality of holes in the pressure sidewall and a hole in the trailing edge region place the tip passage in flow communication with the working medium flow path, wherein the second passage is in fluid communication with the second duct and has a plurality of trip strips normal to the direction of flow, wherein the second turning passage extends between the second passage and the third passage, the turning passage having a plurality of turning vanes for turning the flow, and a vane extending between the suction sidewall and the pressure sidewall, the vane being spaced from the first baffle leaving a subpassage therebetween and further having at least one angled trip strip extending on one of said sidewalls across the subpassage from the vane to the first baffle, wherein the third passage has a plurality of trip strips extending across the passage normal to the approaching flow, wherein the first turning passage extends between the third passage and the trailing edge region of the blade to place the trailing edge region of the blade in flow communication with the third passage, wherein the first turning passage has a vane extending between the suction sidewall and the pressure sidewall, the vane being spaced from said second baffle leaving a subpassage therebetween, and has at least one angled trip strip extending on one said sidewalls across the subpassage from the vane to the third baffle and is canted toward the approaching flow and, wherein, the trailing edge region of the blade has a plurality of pedestals having spaces therebetween which extend between the suction sidewall and the pressure sidewall to provide for the discharge of cooling air from the rotor blade, the plurality of pedestals being spaced from the second baffle to define a passage for cooling air in the rear portion of the blade, the passage having a plurality of trip strips canted toward the approaching flow and angled at an acute angle with respect to the second baffle.

* * * * *